(12) United States Patent
Shioiri et al.

(10) Patent No.: US 11,454,318 B2
(45) Date of Patent: Sep. 27, 2022

(54) SHIFTING MECHANISM

(71) Applicant: TOYOTA JIDOSHA KABUSHIKI KAISHA, Toyota (JP)

(72) Inventors: Hiroyuki Shioiri, Yokohama (JP); Yoichiro Isami, Mishima (JP); Kenta Kimura, Numazu (JP); Hiroaki Ebuchi, Hadano (JP); Hiroki Yasui, Gotemba (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/521,461

(22) Filed: Nov. 8, 2021

(65) Prior Publication Data

US 2022/0178441 A1 Jun. 9, 2022

(30) Foreign Application Priority Data

Dec. 3, 2020 (JP) .............................. JP2020-201070

(51) Int. Cl.
*F16H 63/32* (2006.01)

(52) U.S. Cl.
CPC ........ *F16H 63/32* (2013.01); *F16H 2063/321* (2013.01)

(58) Field of Classification Search
CPC ............... F16H 63/32; F16H 2063/321; F16H 2063/324; Y10T 74/20183; F16D 2023/141
See application file for complete search history.

(56) References Cited

U.S. PATENT DOCUMENTS

| | | | | |
|---|---|---|---|---|
| 6,164,151 A | * | 12/2000 | Dutson | F16H 63/32 74/473.37 |
| 6,179,040 B1 | * | 1/2001 | Aoki | F16H 63/32 164/113 |
| 2010/0176797 A1 | * | 7/2010 | Fuhrer | F16H 63/32 324/160 |
| 2016/0122857 A1 | * | 5/2016 | Chung | C23C 4/02 74/473.37 |
| 2017/0114896 A1 | * | 4/2017 | Pritts | F16H 63/32 |
| 2021/0123527 A1 | | 4/2021 | Yoshino et al. | |

FOREIGN PATENT DOCUMENTS

| | | |
|---|---|---|
| JP | 2000-009217 A | 1/2000 |
| JP | 2016-070371 A | 5/2016 |
| JP | 2020-118294 A | 8/2020 |

* cited by examiner

*Primary Examiner* — Victor L Macarthur
(74) *Attorney, Agent, or Firm* — Oliff PLC

(57) ABSTRACT

A shifting mechanism in which an inclination of a sleeve with respect to a shift fork is reduced while maintaining a clearance between the shift fork and the sleeve. In the shifting mechanism, an engagement groove is formed entirely around a shift sleeve, and a cutout is formed on the engagement groove. A first diameter of the shift sleeve between predetermined sites of the bottom of the engagement groove within the cutouts is shorter than a second diameter of the shift sleeve between predetermined sites of the bottom of the engagement groove. A straight-line distance between the engagement ridges formed on both ends of the shift fork is longer than the first diameter but shorter than the second diameter.

4 Claims, 7 Drawing Sheets

SHIFTING MECHANISM

The present disclosure claims the benefit of Japanese Patent Application No. 2020-201070 filed on Dec. 3, 2020 with the Japanese Patent Office, the disclosure of which is incorporated herein by reference in its entirety.

BACKGROUND

Field of the Disclosure

The present disclosure relates to the art of a shifting mechanism for shifting a gear stage or an operating mode in a power transmission unit in which the gear stage or the operating mode can be selected from a plurality of stages or modes.

Discussion of the Related Art

JP-A-2000-9217 describes a synchronizing device of a transmission comprising: a clutch hub that is splined onto an output shaft; a sleeve that is fitted onto the clutch hub in a slidable manner; and a shift arm (or shift fork) whose leading end is fitted into a groove formed on an outer circumferential surface of the sleeve. In the synchronizing device taught by JP-A-2000-9217, a tapered guide surface is formed on the leading end of the shift fork to deliver lubrication oil to a contact portion between the leading end of the shift fork and the groove of the sleeve.

JP-A-2016-070371 describes a shift fork of a manual transmission in which a contact portion between a sleeve and the shift fork can be lubricated effectively. According to the teachings of JP-A-2016-070371, the shift fork comprises a plurality of first pads attached to both ends of the shift fork, and a plurality of second pad attached to an intermediate portion of the shift fork between the first pads. Specifically, a width of each of the first pads in an axial direction is wider than a width of each of the second pads in the axial direction. In other words, a clearance between the second pad and the groove of the sleeve in the axial direction is wider than a clearance between the first pad and the groove of the sleeve in the axial direction. According to teachings of JP-A-2016-070371, therefore, a lubrication oil splashed by a gear of the transmission can be supplied smoothly into the clearance between the second pad and the groove of the sleeve, but the lubrication oil is not allowed to flow easily out of the clearance between the first pads and the groove of the sleeve.

JP-A-2020-118294 describes a shifting mechanism in which an endplay between a shift fork and a cam groove in an axial direction is reduced. The shifting mechanism taught by JP-A-2020-118294 comprises: a cam follower that is connected to the shift fork while being fitted into a cam groove, and a spring as a pushing member that pushes the cam follower onto one of guide walls of the cam groove. Since the cam follower is pushed onto one of the guide walls of the cam groove by the spring, the endplay between the shift fork and the cam groove can be reduced so that an axial length of the shifting mechanism taught by JP-A-2020-118294 can be reduced.

As described in JP-A-2000-9217 and JP-A-2016-070371, the leading end of the shift fork is fitted into the groove of the sleeve so that the shift sleeve is moved in the axial direction by shifting the shift fork in the axial direction. In this situation, the sleeve is rotated relatively to the shift fork by a rotation of the output shaft, and if the sleeve is moved in the axial direction together with the shift fork, the leading end of the shift fork slides on the guide wall of the groove. In order to prevent seizure and wear at the contact portion between the shift fork and the groove, according to the teachings of JP-A-2000-9217, the tapered guide surface is formed on the leading end of the shift fork to deliver lubrication oil to the above-mentioned contact portion. However, in order to allow the shift fork to slide smoothly on the groove, and to supply the lubricating oil to the contact portion, it is necessary to maintain a clearance (or endplay) between the leading end of the shift fork and the groove of the sleeve. Therefore, the sleeve may be tilted with respect to the shift fork. If the sleeve is tilted or inclined with respect to the shift fork, the sleeve may not slide smoothly along the groove in the axial direction. That is, a speed change operation of the transmission may not be carried out smoothly. In order to avoid such disadvantage, an inclination of the sleeve with respect to the shift fork may be reduced by increasing a width of the leading end of the shift fork in the axial direction. Nonetheless, if the clearance between the leading end of the shift fork and the groove of the sleeve is reduced as a result of increasing the width of the leading end of the shift fork, the lubrication oil may not be supplied smoothly to between the shift fork and the groove.

SUMMARY

Aspects of preferred embodiments of the present disclosure have been conceived noting the foregoing technical problems, and it is therefore an object of the present disclosure to provide a shifting mechanism in which an inclination of a sleeve with respect to a shift fork is reduced while maintaining a clearance between the shift fork and the sleeve.

An exemplary embodiment of the present disclosure relates to a shifting mechanism, comprising: a shift sleeve that is arranged around a rotary shaft to be rotated integrally with the rotary shaft; a shift fork that reciprocates in an axial direction of the rotary shaft; an engagement groove that is formed entirely on an outer circumference of the shift sleeve; and a pair of cutouts formed on a bottom of the engagement groove. In the shifting mechanism, the shift sleeve is reciprocated in the axial direction by the shift fork but allowed to rotate relatively to the shift fork. The shift fork comprises: an arcuate fork section that is fitted onto the shift sleeve; and at least a pair of engagement ridges formed on an inner circumference of both ends of the fork section, each of which is engaged with the engagement groove. In order to achieve the above-explained objective, according to the exemplary embodiment of the present disclosure, an angle toward the shift fork between: a line drawn between one end of the fork section and a rotational center of the shift sleeve; and a line drawn between the other end of the fork section and the rotational center of the shift sleeve, is a reflex angle. A first diameter of the shift sleeve between a predetermined site of the bottom of the engagement groove within the cutout and a symmetrical site across the rotational center is shorter than a second diameter of the shift sleeve between predetermined sites of the bottom of the engagement groove where the cutout is not formed. In addition, a straight-line distance between the engagement ridges formed on both ends of the fork section is longer than the first diameter but shorter than the second diameter.

In a non-limiting embodiment, the engagement ridges may be formed on the inner circumference of both ends of the fork section across the rotational center of the shift sleeve.

In a non-limiting embodiment, each of the engagement ridges may protrude radially inwardly to be fitted into the engagement groove, and a chord length of the engagement ridge between radially innermost portions in the circumferential direction may be longer than a chord length of the cutout between end portions in the circumferential direction.

In a non-limiting embodiment, the shift fork may further comprise another engagement ridge formed between the engagement ridges formed on the inner circumferences of both ends of the fork section.

Thus, in the shifting mechanism according to the exemplary embodiment of the present disclosure, the engagement ridges formed on both ends of the shift fork are engaged with the engagement groove formed on the outer circumference of the shift sleeve. As described, the first diameter of the shift sleeve between predetermined sites of the bottom of the engagement groove within the cutouts is shorter than the second diameter of the shift sleeve between predetermined sites of the bottom of the engagement groove where the cutout is not formed. In addition, an angle toward the shift fork between: a line drawn between one end of the fork section and a rotational center of the shift sleeve; and a line drawn between the other end of the fork section and the rotational center of the shift sleeve, is a reflex angle. Further, the straight-line distance between the engagement ridges is longer than the first diameter of the shift sleeve, but shorter than the second diameter of the shift sleeve. To this end, circumferential lengths of the shift fork and the engagement ridges formed on the end portions of the shift fork are elongated so that the engagement ridges formed on the end portions of the shift fork are situated further than the rotational center of the shift sleeve in the circumferential direction, between the outer circumference of the shift sleeve and the bottom of the engagement groove in the radial direction. According to the exemplary embodiment of the present disclosure, therefore, an inclination (tan $\theta$) of the shift sleeve with respect to the shift fork can be reduced. For this reason, the shift sleeve may be reciprocated in the axial direction without jamming thereby executing a shifting operation smoothly.

In addition, according to the exemplary embodiment of the present disclosure, the straight-line distance between the engagement ridges formed on both ends of the shift fork is longer than the first diameter of the shift sleeve between the cutouts, but shorter than the second diameter of the shift sleeve between predetermined sites of the bottom of the engagement groove where the cutout is not formed. Therefore, although the engagement ridges formed on both ends of the shift fork are elongated in the circumferential direction, the shift fork may be fitted onto the shift sleeve by inserting the engagement ridges formed on end portions of the shift fork within the engagement groove of the shift sleeve through the cutouts.

Further, the chord length between the end portions of the cutout in the circumferential direction is shorter than the chord length between the radially innermost portions of the engagement ridge of the end portions of the shift fork in the circumferential direction. Therefore, even if the shift fork fitted onto the shift sleeve is displaced in the radial direction by some sort of external factor during rotation of the shift sleeve, the engagement ridge will not enter the cutout. That is, a leading end of the engagement ridge will not come into contact to the end portion of the cutout during rotation of the shift sleeve, and hence undesirable collision noises and vibrations will not be generated. In addition, the engagement ridge will not be worn undesirably.

BRIEF DESCRIPTION OF THE DRAWINGS

Features, aspects, and advantages of exemplary embodiments of the present disclosure will become better understood with reference to the following description and accompanying drawings, which should not limit the disclosure in any way.

DETAILED DESCRIPTION OF THE PREFERRED EMBODIMENT(S)

Embodiments of the present disclosure will now be explained with reference to the accompanying drawings. Note that the embodiments shown below are merely examples the present disclosure, and do not limit the present disclosure.

Figure 1:
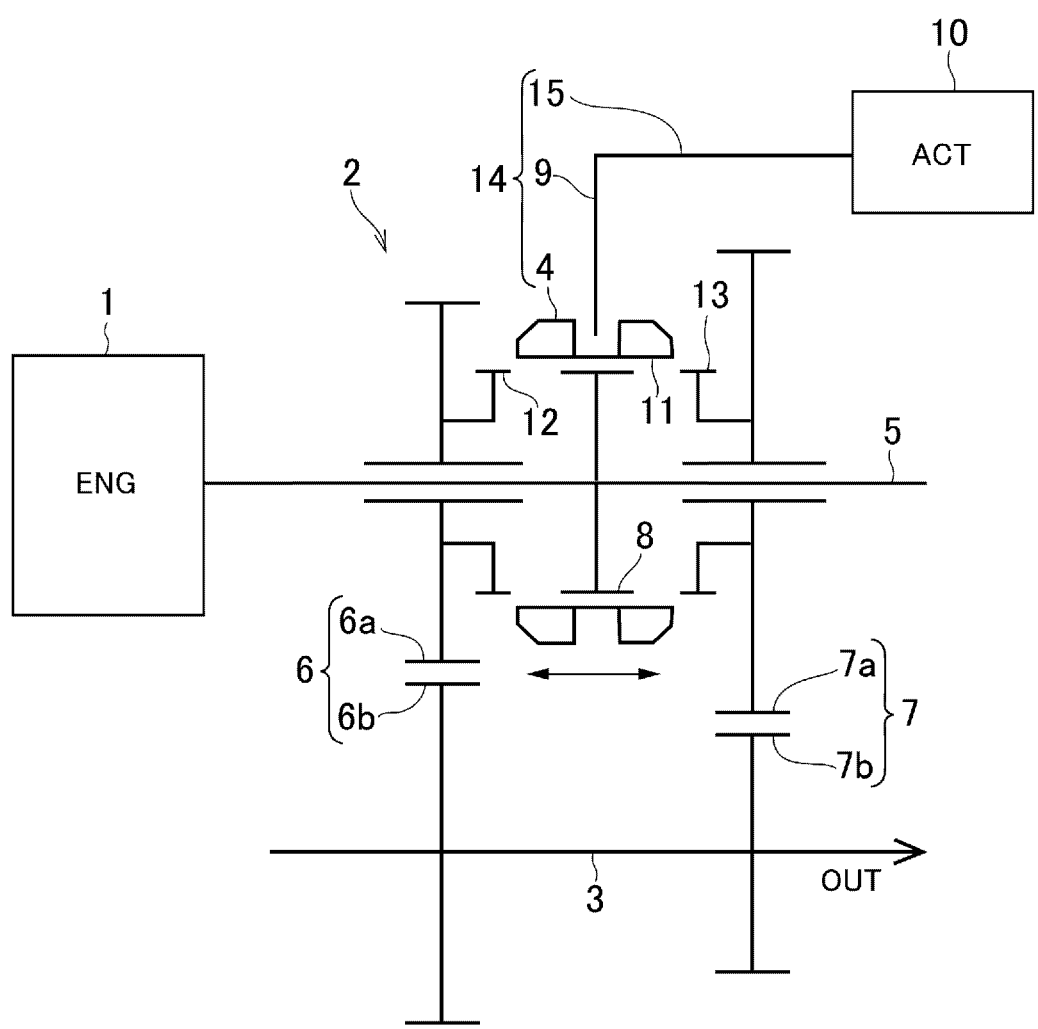
FIG. 1 is a schematic illustration showing one example of a power transmission unit to which the shifting mechanism according to the embodiment of the present disclosure is applied.

Referring now to FIG. 1, there is schematically shown one example of a power transmission unit of a vehicle to which the shifting mechanism according to the first example of the present disclosure is applied. As illustrated in FIG. 1, the power transmission unit comprises an internal combustion engine (as will be simply called the "engine" hereinafter) 1, and an automatic transmission (as will be simply called the "transmission" hereinafter) 2 arranged downstream of the engine 1. For example, a conventional gasoline engine may be adopted as the engine 1. An air intake to the engine 1 and a fuel injection to a combustion chamber of the engine 1 are increased to accelerate the vehicle by depressing an accelerator pedal (not shown). That is, an output power of the engine 1 is changed by manipulating the accelerator pedal. For example, a geared automatic transmission may be adopted as the transmission 2, and a gear stage of the transmission 2 is shifted among a plurality of stages in accordance with a speed of the vehicle and a depression of the accelerator pedal representing a required drive force. A differential gear unit as a final reduction unit is connected to an output shaft 3 of the transmission 2, and a torque delivered from the transmission 2 is distributed to a right drive wheel and a left drive wheel (neither of which are shown) through the differential gear unit.

The transmission 2 comprises: a first gear pair 6 including a first drive gear 6a and a first driven gear 6b; and a second gear pair including a second drive gear 7a and a second driven gear 7b.

In the transmission 2, a first drive gear 6a and a second drive gear 7a are fitted onto a rotary shaft 5 while being allowed to rotate relatively to the rotary shaft 5, and a spline 8 is formed on the rotary shaft 5 between the first drive gear 6a and the second drive gear 7a. In order to shift the gear stage of the transmission 2, a shift sleeve 4 is splined onto the spline 8, and a shift fork 9 is engaged with the shift sleeve 4. The shift fork 9 is reciprocated by an actuator 10 so that the shift sleeve 4 is reciprocated by the shift fork 9 in an axial direction. For example, when the shift sleeve 4 is moved toward the engine 1, the shift sleeve 4 is engaged with the first drive gear 6a to establish a predetermined gear stage. By contrast, when the shift sleeve 4 is withdrawn away from the engine 1, the shift sleeve 4 is engaged with the second drive gear 7a to establish another predetermined gear stage. In FIG. 1, the shift sleeve 4 is situated between the first drive gear 6a and the second drive gear 7a without engaging with those gears so that the transmission 2 is brought into a neutral stage.

Specifically, spline teeth 12 as external teeth are formed on the first drive gear 6a to be engaged with spline teeth 11 formed on an inner circumference of the shift sleeve 4. In order to establish the predetermined gear stage of the transmission 2, a rotational speed of the first drive gear 6a and a rotational speed of the shift sleeve 4 are synchronized with each other. Then, the shift sleeve 4 is moved toward the engine 1 so that the spline teeth 11 of the shift sleeve 4 are engaged with the spline teeth 12 of the first drive gear 6a to establish the predetermined gear stage.

Likewise, spline teeth 13 as external teeth are formed on the second drive gear 7a to be engaged with the spline teeth 11 of the shift sleeve 4. In order to establish another predetermined gear stage of the transmission 2, a rotational speed of the second drive gear 7a and a rotational speed of the shift sleeve 4 are synchronized with each other. Then, the shift sleeve 4 is moved away from the engine 1 so that the spline teeth 11 of the shift sleeve 4 are engaged with the spline teeth 13 of the second drive gear 7a to establish another predetermined gear stage.

Figure 2:
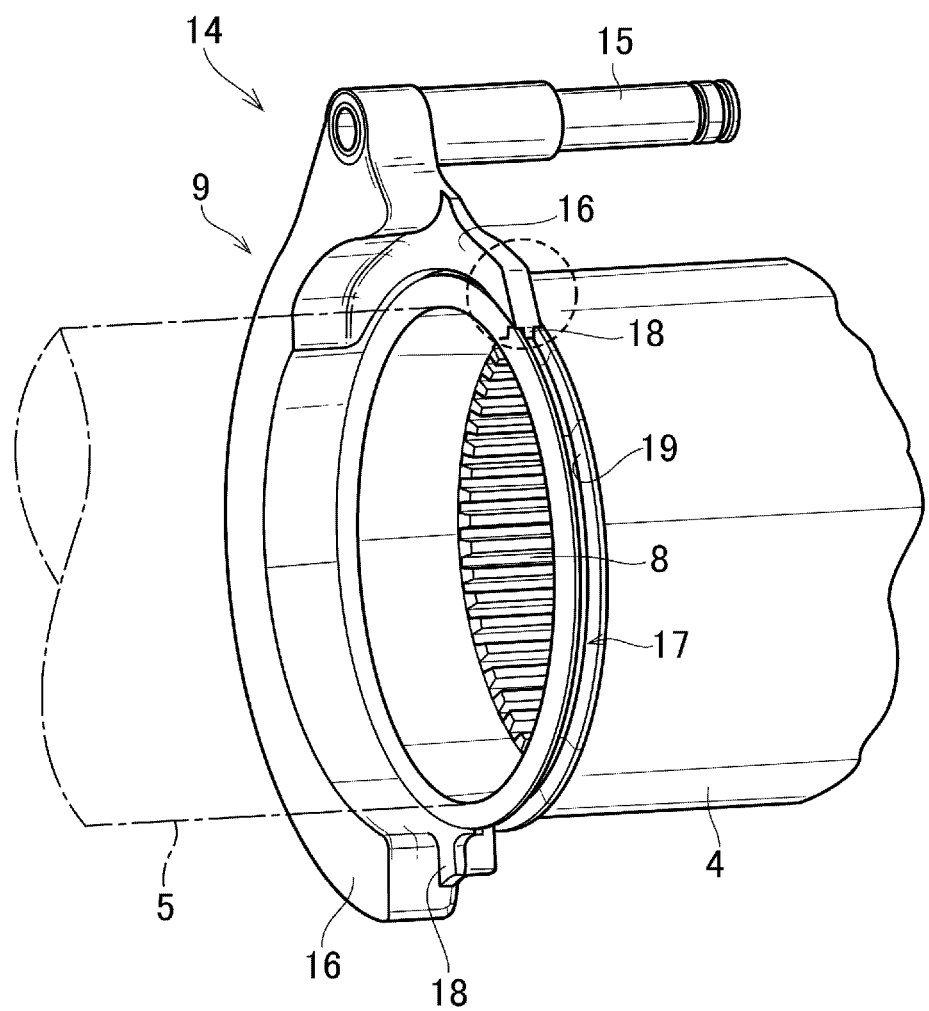
FIG. 2 is a perspective view showing the shifting mechanism according to a first example.

Here will be explained a structure of a shifting mechanism 14 with reference to FIG. 2. As illustrated in FIG. 2, the shifting mechanism 14 comprises a fork shaft 15, the shift fork 9 joined to the fork shaft 15, and the shift sleeve 4 engaged with the shift fork 9.

Specifically, one end of the fork shaft 15 is joined to the above-mentioned actuator 10 as a pushing device, and other end of the fork shaft 15 is joined to the shift fork 9. The shift fork 9 comprises: an arcuate (i.e., C-shaped) fork section 16 formed along an engagement groove 17 formed around an outer circumference of the shift sleeve 4; and at least a pair of engagement ridges 18 formed on an inner circumference of both ends of the fork section 16. As explained later with reference to FIG. 5, according to the first example of the present disclosure, there are three engagement ridges 18 are formed on the inner circumference of the fork section 16 at regular intervals, and each of the engagement ridges 18 protrudes radially inwardly to be fitted into the engagement groove 17. That is, the shift sleeve 4 is allowed to rotate relatively to the shift fork 9, and moved together with the shift fork 9 in the axial direction.

Figure 3:
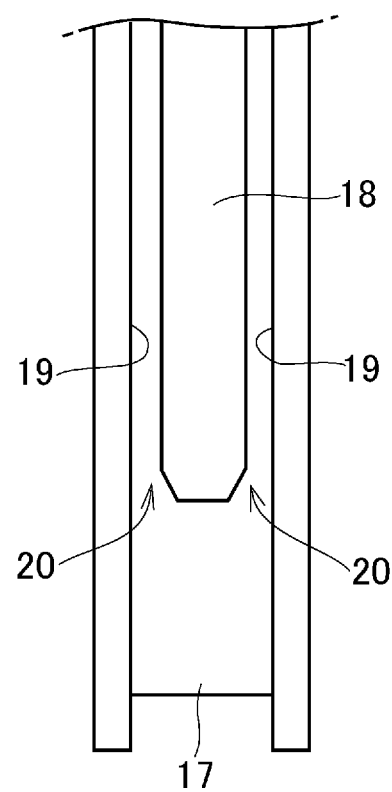
FIG. 3 is a partial enlarged view showing an engagement groove of a shift sleeve.

FIG. 3 is an enlarged partial view showing an engagement site between the fork section 16 of the shift fork 9 and the engagement groove 17 of the shift sleeve 4 enclosed by the dashed circle in FIG. 2. As shown in FIG. 3, in the engagement groove 17, each side wall serves as a contact wall 19 to which the engagement ridge 18 of the shift fork 9 comes into contact when the shift sleeve 4 is reciprocated in the axial direction. In order to allow the shift sleeve 4 to rotate relatively to the shift fork 9, a clearance 20 is maintained between one surface of the engagement ridge 18 and one of the contact walls 19, and between the other surface of the engagement ridge 18 and the other one of the contact walls 19. In order to allow the shift sleeve 4 to slide smoothly along the contact walls 19, oil is supplied to the clearance 20 by e.g., splashing the oil in an oil pan by a rotation of a predetermined gear.

Thus, the fork shaft 15 connected to the shift sleeve 4 through the shift fork 9 is reciprocated in the axial direction by the actuator 10 so that the shift sleeve 4 is selectively engaged with the first drive gear 6a or the second drive gear 7a. However, since the clearances 20 are maintained in the engagement groove 17 on both sides of the engagement ridge 18, the shift sleeve 4 may be inclined undesirably with respect to the shift fork 9 when pushed by the shift fork 9 in one of the axial directions, and may not be reciprocated smoothly in the axal direction. In the shifting mechanism 14 according to the first example of the present disclosure, the shift sleeve 4 is prevented from being inclined respect to the shift fork 9.

Figure 4A:
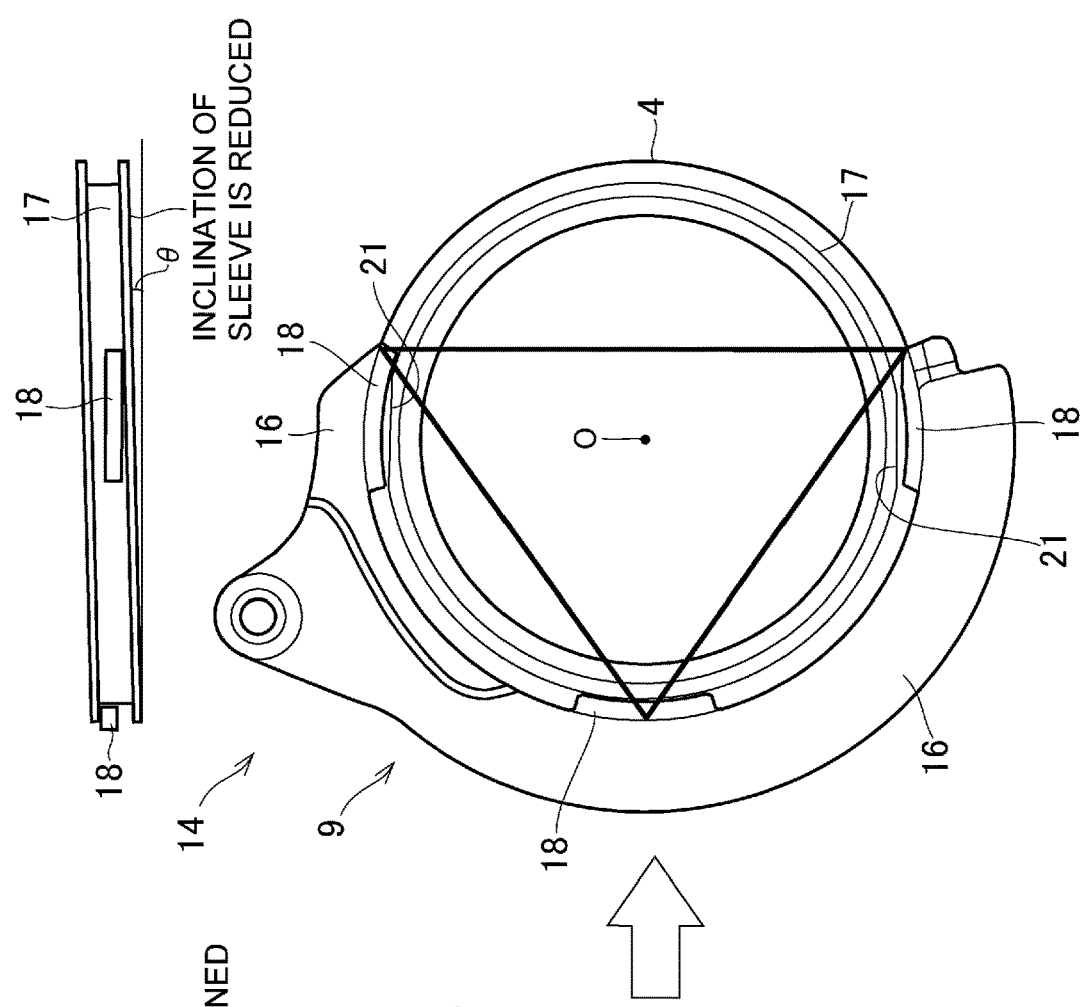
FIG. 4A is a front view of a shifting mechanism according to the prior art.
Figure 4B:
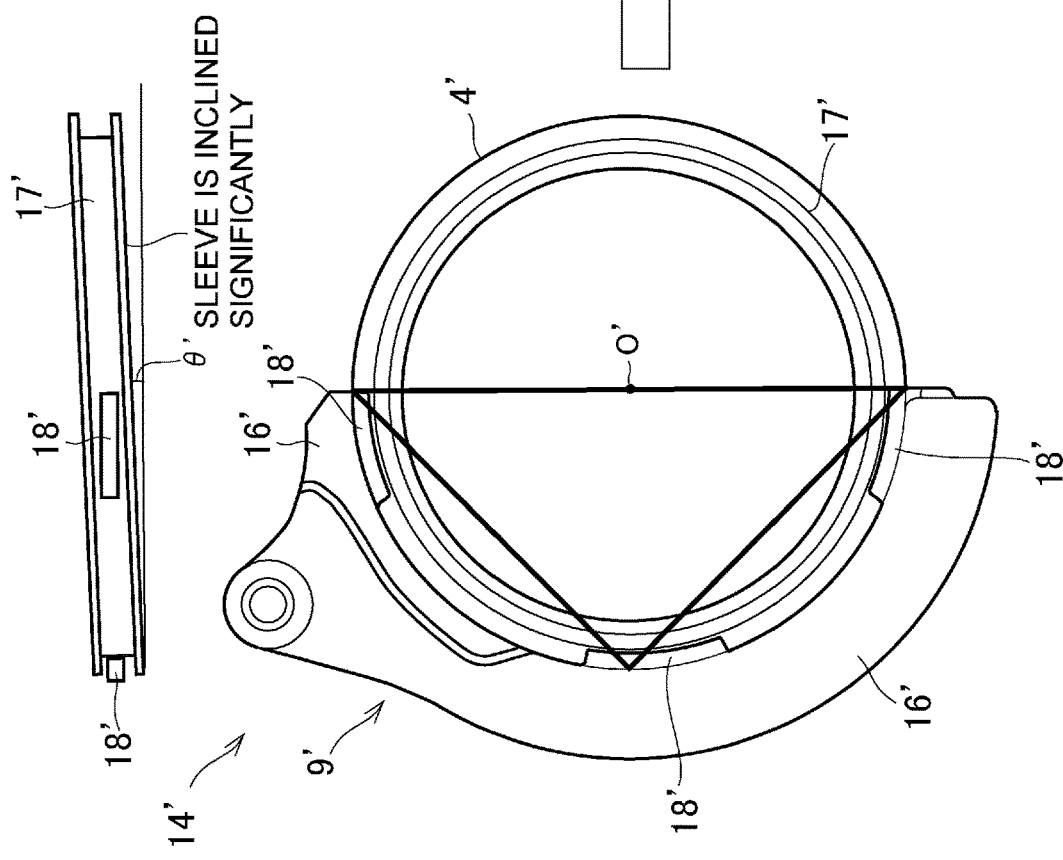
FIG. 4B is a front view of the shifting mechanism according to the first example.

According to the first example of the present disclosure, specifically, a length of the engagement ridge 18 is extended in the circumferential direction longer than the conventional one described e.g., in JP-A-2000-9217 or JP-A-2016-070371. Turning to FIGS. 4A and 4B, there is shown a comparison of between a length of an engagement ridge 18' according to the prior art and a length of the engagement ridge 18 according to the present disclosure. In a shifting mechanism 14' according to the prior art shown in FIG. 4A, engagement sites between the engagement ridges 18' formed on an inner circumference of each end of a fork section 16' and an engagement groove 17' of a shift sleeve 4' are situated symmetrically across a rotational center O' of the shift sleeve 4'. On the other hand, in the shifting mechanism 14 according to the first example of the present disclosure shown in FIG. 4B, each of the engagement ridges 18 formed on the inner circumference of the end portions of the fork section 16 is extended in the circumferential direction so that engagement sites between the engagement ridges 18 and the engagement groove 17 of the shift sleeve 4 are situated further than a rotational center O of the shift sleeve 4 in an opposite side to the fork section 16. That is, the fork section 16 of the shift fork 9 is formed such that an angle toward the fork section 16 between: a line drawn between one end and the rotational center O; and a line drawn between the other end and the rotational center O, is wider than 180 degrees. In other words, the angle toward the fork section 16 between: the line drawn between one end of the fork section 16 and the rotational center O; and the line drawn between the other end of the fork section 16 and the rotational center O, is a reflex angle. Thus, in the shifting mechanism 14 according to the first example of the present disclosure shown in FIG. 4B, an area of the circumference of the shift sleeve 4 covered by the shift fork 9 is wider than an area of the circumference of the shift sleeve 4' covered by the shift fork 9' in the conventional shifting mechanism 14' shown in FIG. 4A. To this end, optionally, a circumferential length of the fork section 16 of the shift fork 9 may also be elongated That is, provided that a diameter of the shift fork 9 according to the first example of the present disclosure is identical to a diameter of the shift fork 9' according to the prior art, a circumferential length of the shift fork 9 is longer than a circumferential length of the shift fork 9' according to the prior art. Specifically, the circumferential length of the shift fork 9 is longer than a semicircular length of the engagement groove 17 of the shift sleeve 4. Further, each distance between the intermediate engagement ridge 18 and the engagement ridges 18 formed on the end portions of the fork section 16 in the shifting mechanism 14 shown in FIG. 4B is longer than each distance between the intermediate engagement ridge 18' and the engagement ridges 18' formed on the end portions of the fork section 16' in the shifting mechanism 14' shown in FIG. 4A.

Figure 5:
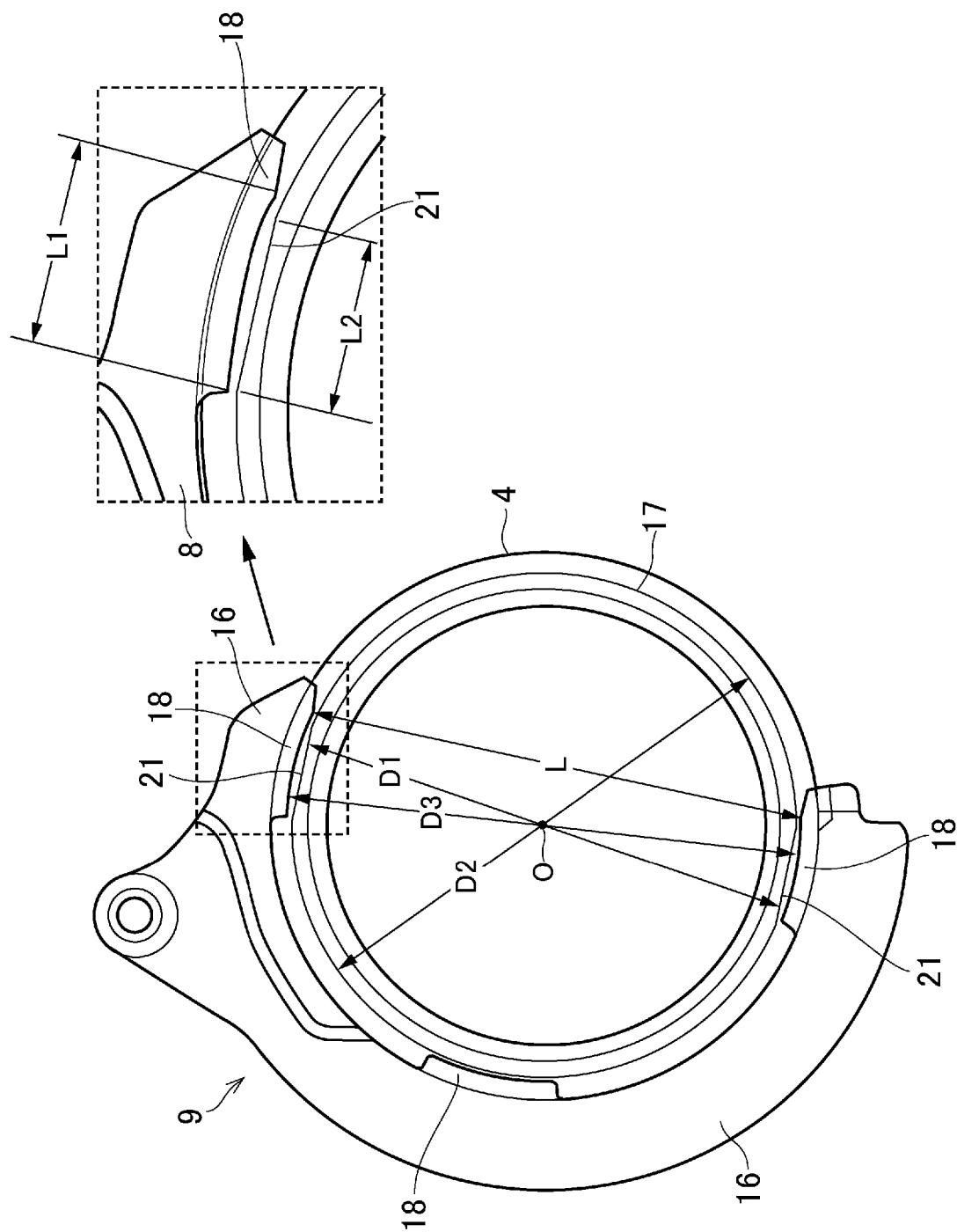
FIG. 5 is a front view showing dimensions of the shift sleeve and a shift fork, and dimensions of an engagement ridge of the shift fork and a cutout of the shift sleeve in an enlarged scale.

As described, according to the first example of the present disclosure, each of the engagement ridges 18 formed on the inner circumference of the end portion of the fork section 16 is extended in the circumferential direction. That is, a distance between the leading ends of the engagement ridges 18 formed on the inner circumference of both ends of the fork section 16 is shorter than a diameter of the shift sleeve 4 between predetermined sites of the bottom of the engagement groove 17 across the rotational center O. Therefore, it may be difficult to fit the fork section 16 of the shift fork 9 onto the shift sleeve 4. In order to fit the fork section 16 of the shift fork 9 easily onto the shift sleeve 4, as illustrated in FIG. 5, a pair of cutouts 21 is formed on a bottom of the engagement groove 17 of the shift sleeve 4 in the shifting mechanism 14 according to the first example of the present disclosure.

Specifically, the cutouts 21 are formed on the bottom of the engagement groove 17 at symmetrical sites across the rotational center O. Accordingly, a first diameter D1 of the shift sleeve 4 between a predetermined site of the bottom of the engagement groove 17 within one of the cutouts 21 and a predetermined site of the bottom of the engagement groove 17 within the other one of the cutouts 21 across the rotational center O is shorter than a straight-line distance L between the leading ends of the engagement ridges 18 formed on the inner circumference of the end portions of the fork section 16. That is, a second diameter D2 of the shift sleeve 4 between predetermined sites of the bottom of the engagement groove 17 where the cutouts 21 are not formed across the rotational center O is longer than the straight-line distance L, and the straight-line distance L is longer than the first diameter D1. In addition, a diameter D3 of the shift fork 9 between predetermined sites of the engagement ridges 18 formed on the inner circumference of end portions of the fork section 16 across the rotational center O is longer than the second diameter D2. Specifically, a relation among the diameters D1 to D3 and the straight-line distance L in the shift sleeve 4 may be expressed as $D1<L<D2<D3$.

In addition, a chord length L1 between radially innermost portions of the engagement ridge 18 formed on the inner circumference of the end portion of the fork section 16 in the circumferential direction is longer than a chord length L2 between end portions of the cutout 21 in the circumferential direction. Therefore, even if the shift fork 9 fitted onto the shift sleeve 4 is displaced in the radial direction by some sort of external factor during rotation of the shift sleeve 4, the engagement ridge 18 will not enter the cutout 21. That is, the leading end of the engagement ridge 18 will not come into contact to the end portion of the cutout 21 during rotation of the shift sleeve 4, and hence undesirable collision noises and vibrations will not be generated.

Thus, according to the first example of the present disclosure, a length of each of the engagement ridges 18 formed on the inner circumference of the end portion of the fork section 16 is extended in the circumferential direction so that the engagement ridges 18 formed on the end portions of the shift fork 9 are situated further than the rotational center of the shift sleeve 4. As described, the engagement groove 17 is formed entirely around the shift sleeve 4, and the cutouts 21 are formed on the bottom of the engagement groove 17 at symmetrical sites across the rotational center O. In the shift sleeve 4, therefore, the first diameter D1 between a predetermined site within one of the cutouts 21 and a predetermined site within the other one of the cutouts 21 across the rotational center O is shorter than the second diameter D2 between predetermined sites of the bottom of the engagement groove 17 across the rotational center O. To this end, the fork section 16 of the shift fork 9 is formed such that an angle toward the fork section 16 between: a line drawn between one end and the rotational center O; and a line drawn between the other end and the rotational center O, is wider than 180 degrees. In other words, the angle toward the fork section 16 between: the line drawn between one end of the fork section 16 and the rotational center O; and the line drawn between the other end of the fork section 16 and the rotational center O, is a reflex angle. That is, the straight-line distance L between the leading ends of the engagement ridges 18 formed on the inner circumference of the end portions of the fork section 16 is longer than the first diameter D1 of the shift sleeve 4, but shorter than the second diameter D2 of the shift sleeve 4. In the shifting mechanism 14 according to the first example of the present disclosure, therefore, the engagement ridges 18 formed on the inner circumference of the end portions of the fork section 16 are engaged with the engagement groove 17 of the shift sleeve 4 at sites further than the rotational center O in the circumferential direction, and situated between the outer circumference of the shift sleeve 4 and the bottom of the engagement groove 17 in the radial direction. For these reasons, as shown in FIG. 4B, an inclination ($\tan \theta$) of the shift sleeve 4 with respect to the shift fork 9 can be reduced compared to that of the prior art shown in FIG. 4A. According to the first example of the present disclosure, therefore, the shift sleeve 4 may be reciprocated smoothly in the axial direction by the actuator 10 though the shift fork 9 to be engaged with the first drive gear 6a or the second drive gear 7a without jamming.

As also described, according to the first example of the present disclosure, there are three engagement ridges 18 are formed on the inner circumference of the fork section 16 at regular intervals. That is, the shift sleeve 4 is supported at three points by the shift fork 9 in such a manner that an equilateral triangle is drawn by connecting the supporting points. According to the first example of the present disclosure, therefore, the shift sleeve 4 can be supported in a stable manner.

Figure 6:
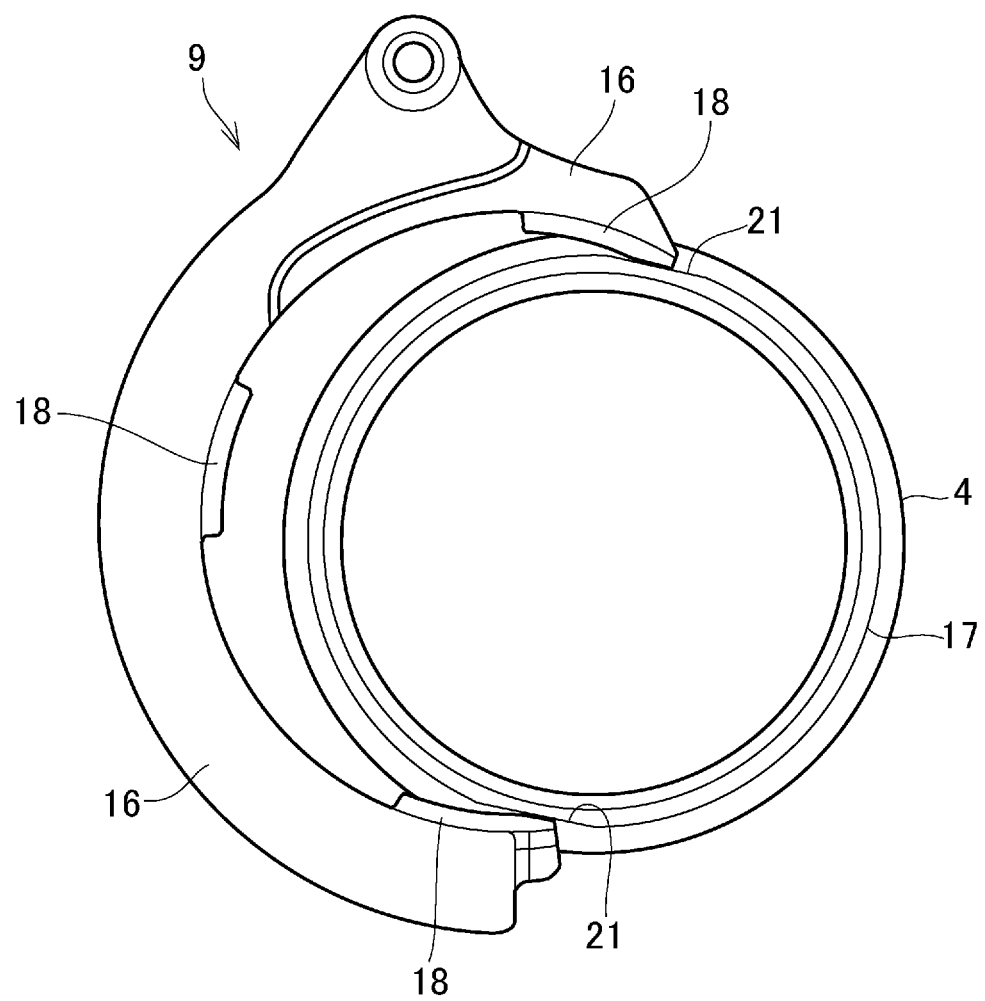
FIG. 6 is an explanatory drawing showing a positional relation between the shift fork and the shift sleeve during the process of fitting the shift fork onto the shift sleeve.

Moreover, the first diameter D1 of the shift sleeve 4 between the cutouts 21 across the rotational center O is shorter than the straight-line distance L between the leading ends of the engagement ridges 18 of the shift fork 9. Therefore, although the engagement ridges 18 formed on both ends of the fork section 16 are elongated in the circumferential direction, the shift fork 9 may be fitted onto the shift sleeve 4 by fitting those engagement ridges 18 into the engagement groove 17 through the cutouts 21 as illustrated in FIG. 6.

Further, the chord length L2 between the end portions of the cutout 21 in the circumferential direction is shorter than the chord length L1 between radially innermost portions of the engagement ridge 18 of the end portion of the fork section 16 in the circumferential direction. Therefore, even if the shift fork 9 fitted onto the shift sleeve 4 is displaced in the radial direction by some sort of external factor during rotation of the shift sleeve 4, the engagement ridge 18 will not enter the cutout 21. That is, a leading end of the engagement ridge 18 will not come into contact to the end portion of the cutout 21 during rotation of the shift sleeve 4, and hence undesirable collision noises and vibrations will not be generated. In addition, the engagement ridge 18 will not be worn undesirably.

Furthermore, since the shift sleeve 4 can be reciprocated smoothly in the axial direction, it is not necessary to elongate lengths of the spline the spline teeth 11 of the shift sleeve 4, the spline teeth 12 of the first drive gear 6a, and the spline teeth 13 of the second drive gear 7a for the purpose of stabilizing a posture of the shift sleeve 4 with respect to those gears. Therefore, it is not necessary to elongate a length of the power transmission unit to arrange the shifting mechanism 14 in the power transmission unit. In addition, a contact load acting between the spline teeth 11 of the shift sleeve 4 and the spline teeth 12 of the first drive gear 6a or the spline teeth 13 of the second drive gear 7a will not be increased by an inclination of the shift sleeve 4 with respect to the shift fork 9. Therefore, it is not necessary to apply hardening treatment to the spline teeth 11 of the shift sleeve 4, the spline teeth 12 of the first drive gear 6a, and the spline teeth 13 of the second drive gear 7a to prevent abrasion of those spline tooth. For this reason, a manufacturing cost of the shifting mechanism 14 may be reduced.

Figure 7B:
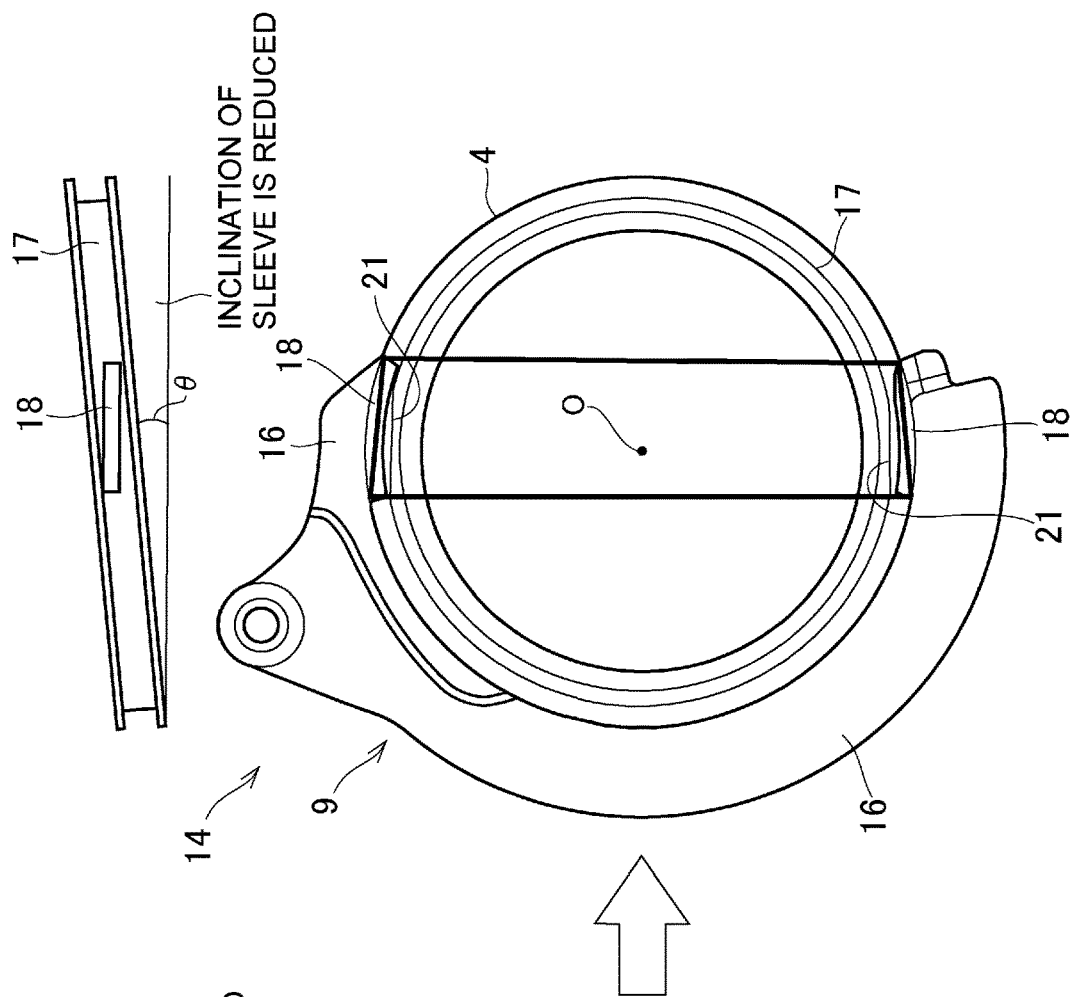
FIG. 7B is a front view of the shifting mechanism according to the second example.
Figure 7A:
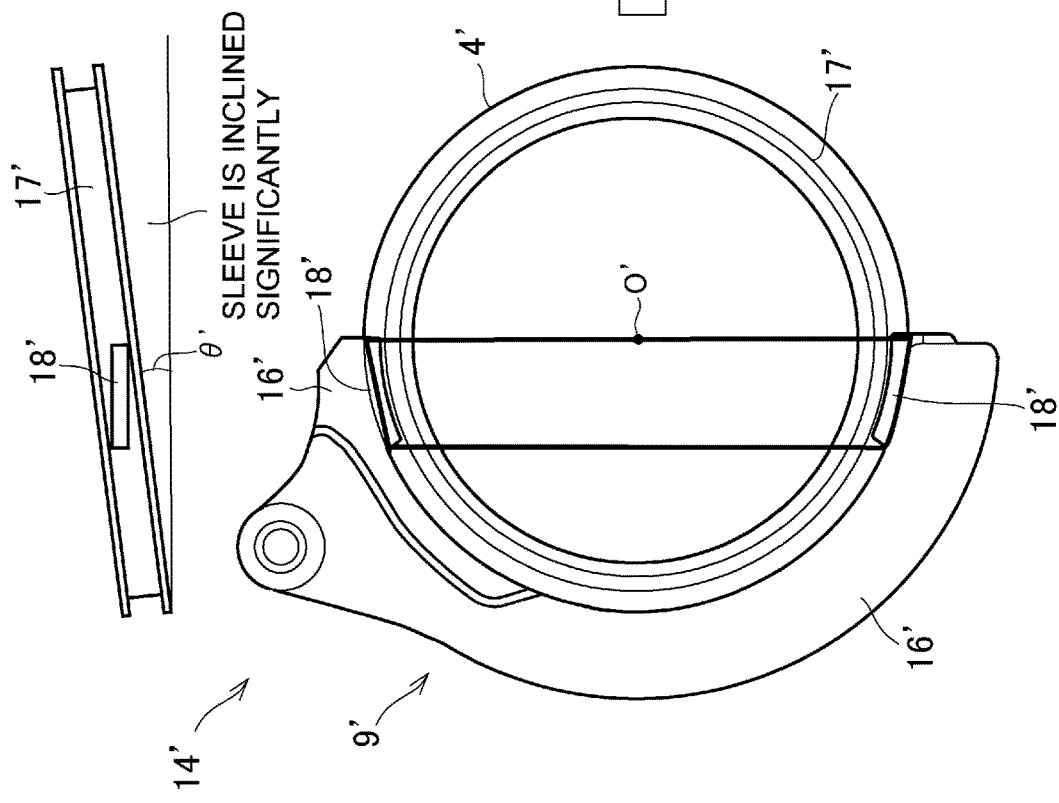
FIG. 7A is a front view of the shifting mechanism according to the prior art.

Although the above exemplary embodiment of the present disclosure has been described, it will be understood by those skilled in the art that the shifting mechanism according to the present disclosure should not be limited to the described exemplary embodiment, and various changes and modifications can be made within the scope of the present disclosure. Turning to FIGS. 7A and 7B, there is shown a comparison between the shifting mechanism 14' and the shifting mechanism 14 according to the second example of the present disclosure. Specifically, FIG. 7A shows the shifting mechanism 14' according to the prior art, and FIG. 7B shows the shifting mechanism 14 according to the second example of the present disclosure. In the shifting mechanism 14 shown in FIG. 7B, the engagement ridges 18 are formed only on the inner circumference of both ends of the fork section 16. According to the second example, a length of each of the engagement ridge 18 is also extended in the circumferential direction to be longer than the engagement ridge 18' according to the prior art. According to the second example, therefore, an inclination (tan θ) of the shift sleeve 4 with respect to the shift fork 9 shown in FIG. 7B may also be reduced compared to that of the prior art shown in FIG. 7A. For this reason, the shift sleeve 4 may also be reciprocated smoothly in the axial direction by the actuator 10. The remaining structure of the shifting mechanism 14 shown in FIG. 7B is similar to that of the shifting mechanism 14 according to the foregoing example.

Further, one of the cutouts 21 be omitted as long as the shift fork 9 is allowed to be fitted onto the shift sleeve 4.

What is claimed is:

1. A shifting mechanism, comprising:
   a shift sleeve that is arranged around a rotary shaft to be rotated integrally with the rotary shaft;
   a shift fork that reciprocates in an axial direction of the rotary shaft; and
   an engagement groove that is formed entirely on an outer circumference of the shift sleeve,
   a pair of cutouts formed on a bottom of the engagement groove,
   wherein the shift sleeve is reciprocated in the axial direction by the shift fork but allowed to rotate relatively to the shift fork,
   the shift fork comprises
      an arcuate fork section that is fitted onto the shift sleeve, and
      at least a pair of engagement ridges formed on an inner circumference of both ends of the fork section, each of which is engaged with the engagement groove,
   an angle toward the shift fork between: a line drawn between one end of the fork section and a rotational center of the shift sleeve; and a line drawn between the other end of the fork section and the rotational center of the shift sleeve, is a reflex angle,
   a first diameter of the shift sleeve between a predetermined site of the bottom of the engagement groove within the cutout and a symmetrical site across the rotational center is shorter than a second diameter of the shift sleeve between predetermined sites of the bottom of the engagement groove where the cutout is not formed, and
   a straight-line distance between the engagement ridges formed on both ends of the fork section is longer than the first diameter but shorter than the second diameter.

2. The shifting mechanism as claimed in claim 1, wherein the engagement ridges are formed on the inner circumference of both ends of the fork section across the rotational center of the shift sleeve.

3. The shifting mechanism as claimed in claim 1,
   wherein each of the engagement ridges protrudes radially inwardly to be fitted into the engagement groove, and
   a chord length of the engagement ridge between radially innermost portions in the circumferential direction is longer than a chord length of the cutout between end portions in the circumferential direction.

4. The shifting mechanism as claimed in claim 1, wherein the shift fork further comprises another engagement ridge formed between the engagement ridges formed on the inner circumferences of both ends of the fork section.

\* \* \* \* \*